UNITED STATES PATENT OFFICE 2,091,372

FRUIT PRODUCT AND PROCESSING

Charles C. Moore, San Francisco, Calif.

No Drawing. Application March 20, 1935,
Serial No. 11,950

4 Claims. (Cl. 99—204)

This invention relates to the treatment of fruit. An object of my invention is to make a crisp, porous fruit product that is substantially dry, in which product there is no material change in the chemical structure of the fruit sugars contained therein. This application is a continuation-in-part of my earlier filed application Ser. No. 393,598 filed Sept. 18, 1929, and now Patent 2,023,536 issued December 10, 1935.

In the drying of fruits, such as prunes, apricots, peaches, grapes, etc., the fruit may be dried either by exposure to the currents of the open air, or by exposure to artificially heated currents of air; in the first instance known as "field drying", in the second instance as "dehydration". In this specification it is to be understood that the term "dehydration" is used in its generic sense and is intended to imply either method of drying.

In commercial practice, where the fruit is dried by exposure to artificially heated currents of air, the temperature of the air is kept well below 75 degrees Cent. in order to avoid inversion of the fruit sugars, which sugars largely consist of fructose sugar. Due to the retentive property that fruit sugars have for moisture, it is seldom that fruit is dehydrated to a moisture content as low as 15 per cent. The usual dehydrated fruit as delivered by the producer of the fruit may have a moisture content ranging from 15 to 25 per cent, the receivers of the fruit storing it in bins for subsequent packing in form for market; and the fruit so stored subjects it to dust and insect contamination thereby necessitating that the fruit be washed and cleansed at the time it is packed for market distribution, commonly known as "processing". This washing or processing further increases the moisture content of the fruit until its moisture content may be 33 per cent. It is, of course, not consistent to apply the term "dried fruit" to a fruit product that is one-third moisture, yet it is done.

The term "substantially-dry," as used in this specification and the appended claims, is understood to mean that the moisture content is so reduced that further treatment results in no practical reduction. It is generally known to chemists that a substance high in sugar content, such as the sugars in dried fruit, resists complete removal of moisture, and it is customary to refer to such substances as being substantially dry even though they may have a moisture content of about 2 per cent. Also it is generally known to chemists that fructose sugar constitutes about 80 per cent of the total sugars in fruits, which fructose sugar is so sensitive to temperature that a sustained temperature of 73–75 degrees Cent. inverts or changes it to a sugar of different chemical structure and physical properties. Such changes are detrimental to the fruit as a food substance. As the fructose sugar of the fruit undergoes inversion or change, the color and sweetness are lowered according to the extent of the inversion, and the changes may range from inappreciable to a very dark substance that is devoid of the palatable quality of the natural fruit sugars. Herein the phrase "material change in the chemical structure of the fruit sugars" is understood to mean that the change, if any, is not sufficient to be noticed by a consumer of the fruit as a food product. There might possibly be found some very slight change in the sugars, when subjected to accurate laboratory examination by expert chemists, but any such changes are so immaterial that they are not detected by careful tasting.

My invention resides in an improved method of reducing the moisture content of dehydrated fruit, whether it be processed or not, to a condition of substantial dryness, as well as the product resulting therefrom. The dehydrated fruit is enclosed in a suitable chamber adaptable for either vacuum or pressure conditions, suitable valves and pipe lines connecting with a vacuum pump and a steam boiler or other suitable means for making a heating medium in aeriform state being provided. With the fruit enclosed in the chamber, the vacuum line is opened to produce a suitable vacuum, such as about 25 inches mercury. While such initial vacuum is not essential to my process, it has been found that the application of steam to the fruit is made much more effective if the air in the drying chamber has first been removed. Under this condition the steam, when it is admitted, is not diluted with air and is brought more intimately in contact with the fruit, and into spaces in the fruit that were filled with air.

The vacuum line is then closed and the steam line opened to obtain a suitable pressure, such as 10 to 15 pounds gauge pressure, which pressure is maintained for a suitable period of time, such as two or three minutes. The steam line is then closed, the pressure released by means of a suitable escape line, and the vacuum line opened. Though the temperature to which the fruit is subjected is far in excess of that at which the fructose sugars in the fruit would invert or change, it is to be remembered that the fruit has the normal atmospheric temperature before it is subjected to the steam vapor of about 115 degrees Cent., and that the short period of time does not permit of the fruit taking the temperature of the surrounding vapor to cause a material change in the fructose sugar before the temperature of the vapor is lowered through the lowering of the pressure by the escape line and the subsequent opening of the vacuum line. While I have found that with a lower pressure than 15 pounds gauge pressure, the time of application is lengthened accordingly, yet I find it to be good practice to make use of the temperature of vapor at 15 pounds gauge pressure, and applying this temperature for two minutes, these being generally safe and sufficient conditions.

It has been found that when dehydrated fruit is subjected to steam pressure, as I have described, the pressure released and this followed by a rapid reduction in pressure by means of the vacuum line being opened, there is a rapid expansion of the moisture vapor throughout the mass of fruit. The extent of this expansion may be controlled by a control of the vacuum line valve. When the vacuum line valve is opened rapidly, the result is a "puffing action" that expands the fruit and enlarges the pores of the fruit such that, when the fruit is substantially dry and cooled to normal temperature, the fruit is of a friable character that is easily crushed to such small particles as may be desired for certain uses of fruit in this form. Herein, it is believed, lies the reason for the improved physical characteristics manifested by fruit products dried in accordance with the disclosure of this application.

Continuation of the evaporation process eliminates substantially all of the moisture in the fruit. Apparently this initial "puffing action" and enlargement of the pores following the rapid expansion of the moisture vapor in the fruit when the pressure is suitably lowered accounts for the higher degree of dryness that is obtained in the final product. The result is a crisp, enlarged mass which is friable as distinguished from a hard compact mass that is not easily broken into small pieces. The friable mass is far more readily broken into small particles or chips for use as a food ready to serve with milk or cream, and is, in appearance, much like some of the well known cereal foods that are ready to serve with milk or cream. Also, the friable mass is far more readily ground into a fruit flour and, in whatever form the friable product is given, it is better suited for mastication. The natural flavor and color of the fruit are retained in the substantially-dry fruit through the procedure for drying that is set forth herein and, because the more porous product absorbs moisture far more readily, it is better adapted for cooking purposes.

Due to the fact that the rapid vaporization of moisture in the fruit leads to a rapid lowering of temperature in the fruit, it has been found desirable to continue the application of a moderate heat, below the inversion temperature of the fructose sugars in the fruit, after the application of the steam is discontinued. To obtain this continued application of heat, pipe lines or radiators may be fixed in the chamber, or some other suitable source of heat such as a water jacket surrounding the chamber with control of the heat, or temperature, that may be supplied. It has been found that this additional heat materially speeds the drying.

Hot air or hot gas or mixtures of these may be used instead of steam as the heating medium in aeriform state. Because steam is easily obtained in the ordinary boiler, and is easily controlled, it appears to be preferable. But it is to be understood that the phrase "heating medium in aeriform state," as used in this specification and appended claims, implies steam, air, gas or any mixtures of these.

When certain fresh fruits are to be dried, such as apples, apricots, peaches, pears, etc., it is customary to cut these fruits in two or more pieces preparatory to drying or dehydration; and, in the dried fruit industry these fruits are referred to as cut fruits in order to distinguish them from fruits that are not cut in two or more pieces before drying, such as prunes, grapes, etc. Though the preliminary treatment varies, these two classes of fruits are dehydrated in practically the same manner; and, as is to be expected, the cut-fruit class is more readily lowered in moisture content than is the other class, the whole fruit such as prunes, grapes, etc., because the whole fruit is more resistant to a heating medium in aeriform state and more resistant to vaporization of moisture through the enclosing cortex. To overcome the difficulty of treating dehydrated whole-fruit, such as prunes, grapes, etc., by my procedure as herein set forth, the dehydrated prunes, grapes, etc., may be macerated in the manner set forth in my Patent No. 1,543,948, which macerated fruit is then pressed into any suitable form, such as masses, cakes, etc., and then subjected to the treatment hereinbefore described for reducing it to substantial dryness without material change in the fruit sugars. The application of steam to such forms of compressed masses or cakes of macerated fruit, followed by the vacuum treatment as I have described herein, results in a friable product that may be easily crushed or ground to obtain a more convenient form for use in the household as a food product ready to serve with milk or cream, or general use in cooking.

It is obvious that any fruit, after being dehydrated, can be macerated and pressed into any suitable form, and then reduced to substantial dryness as above described. It is understood in this specification that the term "suitable form" implies the whole fruit, or mere pieces of it, or any macerated or processed form of either class of dried or dehydrated fruits.

The factor of pressure together with the factor of time through which the heating medium in aeriform state is supplied may be varied in degree, and changes may be made without departing from the basic principles above described. It is understood, therefore, that my invention is not to be confined to the details disclosed but includes all departures therefrom falling within the terms of the appended claims.

What I claim is:

1. The process of reducing a suitable form of dehydrated fruit containing a considerable percentage of fructose sugar to a substantially dry and distended condition without material change in the chemical structure of the fruit sugars contained therein, which process consists in placing the fruit in a chamber and subjecting it for a short period of time to a heating medium in aeriform state at a temperature considerably in excess of that at which frustose sugar inverts to heat the fruit to a temperature near the point of inversion, withdrawing the heating medium before the fruit has absorbed sufficient heat to cause inversion, immediately rapidly reducing the pressure by opening a vacuum-line connection with the chamber whereby the internal pressure existing in the pieces of fruit will cause the pieces to distend, and continuing the vacuum while maintaining the chamber heated at a temperature below the inversion temperature of fructose sugar, until the fruit is substantially dry.

2. The process of reducing a suitable form of dehydrated fruit containing a considerable percentage of frustose sugar to a substantially dry and distended condition without material change in the chemical structure of the fruit sugars contained therein, which process consists in placing the fruit in a chamber and subjecting it for a short period of time to steam at a temperature considerably in excess of that at which fructose sugar inverts to heat the fruit to a temperature near the point of inversion, withdrawing the steam before the fruit has absorbed sufficient heat to cause inversion, immediately rapidly reducing the pressure by opening a vacuum-line connection with the chamber whereby the internal pressure existing in the pieces of fruit will cause the pieces to distend, and continuing the vacuum while maintaining the chamber heated at a temperature below the inversion temperature of fructose sugar, until the fruit is substantially dry.

3. The process of reducing a suitable form of dehydrated fruit containing a considerable percentage of fructose sugar to a substantially dry and distended condition without material change in the chemical structure of the fruit sugars contained therein, which process consists in placing the fruit in a chamber and subjecting it for several minutes to a heating medium in aeriform state at a temperature considerably in excess of that at which fructose sugar inverts to heat the fruit to a temperature near the point of inversion, withdrawing the heating medium before the fruit has absorbed sufficient heat to cause inversion, immediately rapidly reducing the pressure by opening a vacuum-line connection with the chamber whereby the internal pressure existing in the pieces of fruit will cause the pieces to distend, and continuing the vacuum while maintaining the chamber heated at a temperature below the inversion temperature of fructose sugar, until the fruit is substantially dry.

4. The process of reducing a suitable form of dehydrated fruit containing a considerable percentage of fructose sugar to a substantially dry and distended condition without material change in the chemical structure of the fruit sugars contained therein, which process consists in placing the fruit in a chamber and subjecting it for several minutes to steam at a temperature considerably in excess of that at which frustose sugar inverts to heat the fruit to a temperature near the point of inversion, withdrawing the steam before the fruit has absorbed sufficient heat to cause inversion, immediately rapidly reducing the pressure by opening a vacuum-line connection with the chamber whereby the internal pressure existing in the pieces of fruit will cause the pieces to distend, and continuing the vacuum while maintaining the chamber heated at a temperature below the inversion temperature of fructose sugar, until the fruit is substantially dry.

CHARLES C. MOORE.